United States Patent
Kimes et al.

(10) Patent No.: US 9,371,868 B2
(45) Date of Patent: Jun. 21, 2016

(54) COUPLING MEMBER SUBASSEMBLY FOR USE IN CONTROLLABLE COUPLING ASSEMBLY AND ELECTROMECHANICAL APPARATUS HAVING A PAIR OF SIMULTANEOUSLY ACTUATED ELEMENTS FOR USE IN THE SUBASSEMBLY

(71) Applicant: Means Industries, Inc., Saginaw, MI (US)

(72) Inventors: John W. Kimes, Wayne, MI (US); Terry O. Hendrick, Cass City, MI (US)

(73) Assignee: Means Industries, Inc., Saginaw, MI (US)

( * ) Notice: Subject to any disclaimer, the term of this patent is extended or adjusted under 35 U.S.C. 154(b) by 86 days.

(21) Appl. No.: 14/299,139

(22) Filed: Jun. 9, 2014

(65) Prior Publication Data

US 2015/0060225 A1   Mar. 5, 2015

Related U.S. Application Data

(60) Provisional application No. 61/870,449, filed on Aug. 27, 2013.

(51) Int. Cl.
| | |
|---|---|
| *F16D 41/14* | (2006.01) |
| *F16D 27/02* | (2006.01) |
| *F16D 41/12* | (2006.01) |

(52) U.S. Cl.
CPC .............. *F16D 27/02* (2013.01); *F16D 41/125* (2013.01); *F16D 41/14* (2013.01)

(58) Field of Classification Search
CPC ......... F16D 41/14; F16D 27/10; F16D 27/02; F16D 41/125
See application file for complete search history.

(56) References Cited

U.S. PATENT DOCUMENTS

| | | | |
|---|---|---|---|
| 2,960,287 A | 11/1960 | Barlow | |
| 3,130,989 A | 4/1964 | Lannen | |
| 4,050,560 A * | 9/1977 | Torstenfelt | F02C 7/36 |
| | | | 192/103 F |

(Continued)

FOREIGN PATENT DOCUMENTS

GB    1007475 A    10/1965

OTHER PUBLICATIONS

International Search Report and Written Opinion; International application No. PCT/US2014/048774; date of mailing Nov. 14, 2014.

(Continued)

*Primary Examiner* — Jacob S Scott
*Assistant Examiner* — Lillian Nguyen
(74) *Attorney, Agent, or Firm* — Brooks Kushman P.C.

(57) ABSTRACT

A coupling member subassembly for use in a controllable coupling assembly and an electromechanical apparatus having a pair of simultaneously actuated elements for use in such a subassembly are provided. The apparatus includes a housing, an electromagnetic source having at least one excitation coil surrounded by the housing and a pair of spaced first and second elements. A reciprocating armature is arranged concentrically relative to the at least one excitation coil and is axially movable when the at least one excitation coil is supplied with current. An actuator bridge is mounted for axial reciprocating movement with the armature and is connected to the elements at opposite ends of the bridge to move the elements in unison between first and second positions during axial movement of the armature to control the operating mode of the assembly.

31 Claims, 5 Drawing Sheets

(56) References Cited

U.S. PATENT DOCUMENTS

| | | | |
|---|---|---|---|
| 4,200,002 A | 4/1980 | Takahashi |
| 4,340,133 A | 7/1982 | Blersch |
| 5,052,534 A | 10/1991 | Gustin et al. |
| 5,070,978 A | 12/1991 | Pires |
| 5,206,573 A | 4/1993 | McCleer et al. |
| 5,231,265 A | 7/1993 | Hackett et al. |
| 5,362,293 A | 11/1994 | Romanauskas |
| 5,387,854 A | 2/1995 | McCleer et al. |
| 5,394,321 A | 2/1995 | McCleer et al. |
| 5,449,057 A | 9/1995 | Frank |
| 5,453,598 A | 9/1995 | Hackett et al. |
| 5,597,057 A | 1/1997 | Ruth et al. |
| 5,638,929 A | 6/1997 | Park |
| 5,642,009 A | 6/1997 | McCleer et al. |
| 5,678,668 A | 10/1997 | Sink |
| 5,806,643 A | 9/1998 | Fitz |
| 5,847,469 A | 12/1998 | Tabata et al. |
| 5,856,709 A | 1/1999 | Ibaraki et al. |
| 5,871,071 A | 2/1999 | Sink |
| 5,918,715 A | 7/1999 | Ruth et al. |
| 5,927,455 A | 7/1999 | Baker et al. |
| 5,954,174 A | 9/1999 | Costin |
| 5,964,331 A | 10/1999 | Reed et al. |
| 5,979,627 A | 11/1999 | Ruth et al. |
| 6,019,699 A | 2/2000 | Hoshiya et al. |
| 6,065,576 A | 5/2000 | Shaw et al. |
| 6,075,302 A | 6/2000 | McCleer |
| 6,116,394 A | 9/2000 | Ruth |
| 6,125,980 A | 10/2000 | Ruth et al. |
| 6,129,190 A | 10/2000 | Reed et al. |
| 6,186,299 B1 | 2/2001 | Ruth |
| 6,193,038 B1 | 2/2001 | Scott et al. |
| 6,237,931 B1 | 5/2001 | Marola |
| 6,244,965 B1 | 6/2001 | Klecker et al. |
| 6,290,044 B1 | 9/2001 | Burgman et al. |
| 6,306,057 B1 | 10/2001 | Morisawa et al. |
| 6,344,008 B1 | 2/2002 | Nagano et al. |
| 6,386,349 B1 | 5/2002 | Welch |
| 6,481,551 B1 | 11/2002 | Ruth |
| 6,503,167 B1 | 1/2003 | Sturm |
| 6,505,721 B1 | 1/2003 | Welch |
| 6,571,926 B2 | 6/2003 | Pawley |
| 6,814,201 B2 | 11/2004 | Thomas |
| 6,846,257 B2 | 1/2005 | Baker et al. |
| 6,854,577 B2 | 2/2005 | Ruth |
| 6,953,409 B2 | 10/2005 | Schmidt et al. |
| 6,982,502 B1 | 1/2006 | Sendaula et al. |
| 7,025,188 B2 | 4/2006 | Lindenschmidt et al. |
| 7,093,512 B2 | 8/2006 | Ibamoto et al. |
| 7,100,756 B2 | 9/2006 | Kimes et al. |
| 7,153,228 B2 | 12/2006 | Fujiu et al. |
| 7,198,587 B2 | 4/2007 | Samie et al. |
| 7,201,690 B2 | 4/2007 | Miura et al. |
| 7,223,198 B2 | 5/2007 | Kimes et al. |
| 7,223,200 B2 | 5/2007 | Kojima et al. |
| 7,255,186 B2 | 8/2007 | Wakuta et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,349,010 B2 | 3/2008 | Bryant et al. |
| 7,383,930 B2 | 6/2008 | Kimes et al. |
| 7,393,296 B2 | 7/2008 | Kano et al. |
| 7,397,296 B1 | 7/2008 | Kiani |
| 7,426,971 B2 | 9/2008 | Kano et al. |
| 7,448,481 B2 | 11/2008 | Kimes et al. |
| 7,451,862 B2 | 11/2008 | Kimes et al. |
| 7,455,156 B2 | 11/2008 | Kimes et al. |
| 7,455,157 B2 | 11/2008 | Kimes et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,614,466 B2 | 11/2009 | Kano et al. |
| 7,621,359 B2 | 11/2009 | Kano et al. |
| 7,661,518 B2 | 2/2010 | Kimes |
| 7,690,455 B2 | 4/2010 | Kano et al. |
| 7,690,492 B2 | 4/2010 | Gooden et al. |
| 7,806,795 B2 | 10/2010 | Oba et al. |
| 7,942,781 B2 | 5/2011 | Kimes |
| 8,007,396 B2 | 8/2011 | Kimes et al. |
| 8,051,959 B2 | 11/2011 | Eisengruber |
| 8,079,453 B2 | 12/2011 | Kimes |
| 8,187,141 B2 | 5/2012 | Goleski et al. |
| 8,196,724 B2 | 6/2012 | Samie et al. |
| 8,272,488 B2 | 9/2012 | Eisengruber et al. |
| 8,286,772 B2 | 10/2012 | Eisengruber |
| 8,324,890 B2 | 12/2012 | Lin |
| 8,491,439 B2 | 7/2013 | Kimes |
| 8,491,440 B2 | 7/2013 | Kimes et al. |
| 2002/0000724 A1 | 1/2002 | Kalargeros et al. |
| 2006/0021838 A1 | 2/2006 | Kimes et al. |
| 2006/0138777 A1 | 6/2006 | Hofbauer et al. |
| 2006/0185957 A1 | 8/2006 | Kimes et al. |
| 2007/0056825 A1 | 3/2007 | Fetting, Jr. et al. |
| 2007/0107960 A1 | 5/2007 | Takami et al. |
| 2007/0278061 A1 | 12/2007 | Wittkopp et al. |
| 2008/0093190 A1 | 4/2008 | Belmont |
| 2008/0110715 A1 | 5/2008 | Pawley |
| 2008/0135369 A1 | 6/2008 | Meier |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0188338 A1 | 8/2008 | Kimes et al. |
| 2008/0223681 A1 | 9/2008 | Stevenson et al. |
| 2008/0245360 A1 | 10/2008 | Almy et al. |
| 2009/0062058 A1 | 3/2009 | Kimes et al. |
| 2009/0084653 A1 | 4/2009 | Holmes |
| 2009/0098970 A1 | 4/2009 | Kimes |
| 2009/0127059 A1 | 5/2009 | Knoblauch |
| 2009/0133981 A1 | 5/2009 | Tarasinski et al. |
| 2009/0142207 A1 | 6/2009 | Ring et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0233755 A1 | 9/2009 | Kimes |
| 2009/0255773 A1 | 10/2009 | Seufert et al. |
| 2010/0071497 A1 | 3/2010 | Reisch et al. |
| 2010/0105515 A1 | 4/2010 | Goleski et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0011694 A1* | 1/2011 | Swales ................ F16D 27/118 |
| | | 192/48.2 |
| 2011/0233026 A1 | 9/2011 | Pawley |
| 2012/0021862 A1 | 1/2012 | Isken, II et al. |
| 2012/0145505 A1 | 6/2012 | Kimes |
| 2012/0149518 A1 | 6/2012 | Kimes |
| 2012/0152683 A1 | 6/2012 | Kimes |
| 2012/0152687 A1 | 6/2012 | Kimes et al. |
| 2012/0228076 A1 | 9/2012 | Tate, Jr. et al. |
| 2013/0062151 A1 | 3/2013 | Pawley |

OTHER PUBLICATIONS

International Search Report and Written Opinion; International application No. PCT/US2011/036634; date of mailing Aug. 25, 2011.

International Preliminary Report on Patentability; International application No. PCT/US2011/036634; date of issuance of report Jun. 12, 2013.

International Search Report and Written Opinion; International application No. PCT/US12/050742; date of mailing Nov. 20, 2012.

International Preliminary Report on Patentability; International application No. PCT/US2014/048774; date of issuance of report Mar. 1, 1016.

* cited by examiner

COUPLING MEMBER SUBASSEMBLY FOR USE IN CONTROLLABLE COUPLING ASSEMBLY AND ELECTROMECHANICAL APPARATUS HAVING A PAIR OF SIMULTANEOUSLY ACTUATED ELEMENTS FOR USE IN THE SUBASSEMBLY

CROSS REFERENCE TO RELATED APPLICATION

This application claims the benefit of provisional patent application Ser. No. 61/870,449 filed Aug. 27, 2013.

TECHNICAL FIELD

This invention generally relates to coupling member subassemblies for use in controllable coupling assemblies and electromechanical apparatus having pairs of simultaneously activated elements for use in such subassemblies.

Coupling assemblies such as clutches are used in a wide variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "freewheeling" of the driving member in the second direction relative to the driven member is also known as the "overrunning" condition.

One type of one-way clutch includes coaxial driving and driven plates having generally planar clutch faces in closely spaced, juxtaposed relationship. A plurality of recesses or pockets is formed in the face of the driving plate at angularly spaced locations about the axis, and a strut or pawl is disposed in each of the pockets. Multiple recesses or notches are formed in the face of the driven plate and are engageable with one or more of the struts when the driving plate is rotating in a first direction. When the driving plate rotates in a second direction opposite the first direction, the struts disengage the notches, thereby allowing freewheeling motion of the driving plate with respect to the driven plate.

When the driving plate reverses direction from the second direction to the first direction, the driving plate typically rotates relative to the driven plate until the clutch engages. As the amount of relative rotation increases, the potential for an engagement noise also increases.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

In a powershift transmission, tip-in clunk is one of most difficult challenges due to absence of a torque converter. When the driver tips-in, i.e., depresses the accelerator pedal following a coast condition, gear shift harshness and noise, called clunk, are heard and felt in the passenger compartment due to the mechanical linkage, without a fluid coupling, between the engine and powershift transmission input. Tip-in clunk is especially acute in a parking-lot maneuver, in which a vehicle coasting at low speed is then accelerated in order to maneuver into a parking space.

In order to achieve good shift quality and to eliminate tip-in clunk, a powershift transmission should employ a control strategy that is different from that of a conventional automatic transmission. The control system should address the unique operating characteristics of a powershift transmission and include remedial steps to avoid the objectionable harshness yet not interfere with driver expectations and performance requirements of the powershift transmission. There is a need to eliminate shift harshness and noise associated with tip-in clunk in a powershift transmission.

For purposes of this disclosure, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A pocket plate may be provided with angularly disposed recesses or pockets about the axis of the one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Some U.S. patents related to the present invention include: U.S. Pat. Nos. 5,052,534; 5,070,978; 5,449,057; 5,678,668; 5,806,643; 5,871,071; 5,918,715; 5,964,331; 5,979,627; 6,065,576; 6,116,394; 6,125,980; 6,129,190; 6,186,299; 6,193,038; 6,386,349; 6,481,551; 6,505,721; 6,571,926; 6,814,201; 6,854,577; 7,153,228; 7,275,628; 8,051,959; 8,196,724; and 8,286,772.

Yet still other related U.S. patents include: U.S. Pat. Nos. 4,200,002; 5,954,174; and 7,025,188.

U.S. Pat. No. 6,854,577 discloses a sound-dampened, one-way clutch including a plastic/steel pair of struts to dampen engagement clunk. The plastic strut is slightly longer than the steel strut. This pattern can be doubled to dual engaging. This approach has had some success. However, the dampening function stopped when the plastic parts became exposed to hot oil over a period of time.

Metal injection molding (MIM) is a metalworking process where finely-powdered metal is mixed with a measured amount of binder material to comprise a "feedstock" capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

Other U.S. patent documents related to at least one aspect of the present invention includes U.S. Pat. Nos. 8,491,440; 8,491,439; 8,272,488; 8,187,141; 8,079,453; 8,007,396; 7,942,781; 7,690,492; 7,661,518; 7,455,157; 7,455,156; 7,451,862; 7,448,481; 7,383,930; 7,223,198; 7,100,756; and 6,290,044; and U.S. published application Nos. 2013/0062151; 2012/0152683; 2012/0149518; 2012/0152687; 2012/0145505; 2011/0233026; 2010/0105515; 2010/0230226; 2009/0233755; 2009/0062058; 2008/0110715; 2008/0188338; 2008/0185253; 2006/0185957; and 2006/0021838.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

SUMMARY OF EXAMPLE EMBODIMENTS

An object of at least one embodiment of the present invention is to provide a coupling member subassembly for use in a controllable coupling assembly and electromechanical apparatus for use in such subassemblies wherein a pair of elements are simultaneously activated to change the operating mode of the assembly.

In carrying out the above object and other objects of at least one embodiment of the present invention, an electromechanical apparatus including a pair of simultaneously actuated elements for use in a controllable coupling assembly is provided. The apparatus includes a housing, an electromagnetic source including at least one excitation coil surrounded by the housing and a pair of spaced first and second elements. A reciprocating armature is arranged concentrically relative to the at least one excitation coil and is axially movable when the at least one excitation coil is supplied with current. An actuator bridge is mounted for axial reciprocating movement with the armature and is connected to the elements at opposite ends of the bridge to move the elements in unison between first and second positions during axial movement of the armature to control the operating mode of the assembly.

The first element may be a locking element such as an injection molded strut.

The second element may be an impact energy storage element to absorb and store impact energy to reduce undesirable noise and contact stress caused by a transition between operating modes of the coupling assembly.

The bridge may include a pair of plungers supported at opposite ends of the bridge wherein the elements are pivotally connected to leading ends of their respective plungers.

The at least one coil, the housing and the armature may comprise a low profile solenoid.

The storage element may include a rigid insert having an elastomeric layer surrounding the insert.

The elastomeric layer may be a high temperature-resistant layer molded over the insert.

The storage element may carry elastomeric material defining opposite end sections of the storage element. The end sections may be configured to deflect upon abutting engagement with load-bearing shoulders of coupling members of the coupling assembly.

The insert may be a die casting formed in a metal injection molding (MIM) process.

The apparatus may further include a pair of biasing members. Each of the biasing members may bias its respective plunger and connected element.

The apparatus may further include at least one return biasing member to urge the bridge to a return position which corresponds to second positions of the elements.

The housing may have an axially extending skirt to attach the apparatus to a first or second member of the coupling assembly.

Each element may include at least one projecting leg portion which provides an attachment location for the leading end of its respective plunger.

Each leg portion may have an aperture wherein the apparatus may further include a pivot pin received within each aperture to allow rotational movement of the elements in response to axial movement of the bridge wherein the leading ends of the plungers may be connected to their respective elements via the pivot pins.

Each aperture may be an oblong aperture to receive its respective pivot pin to allow both rotational and translational movement of the elements in response to reciprocating movement of the armature.

Further in carrying out the above object and other objects of at least one embodiment of the present invention, a coupling member subassembly to use in a controllable coupling assembly having multiple operating modes is provided. The subassembly includes a first coupling member of the assembly supported for rotation relative to a second coupling member of the assembly about a common rotational axis. The first coupling member has a first coupling face with a pair of angularly-spaced pockets. Each of the pockets defines a load-bearing first shoulder. The subassembly also includes an electromechanical apparatus attached to the first coupling member. The apparatus includes a housing, an electromagnetic source having at least one excitation coil at least partially surrounded by the housing and a pair of spaced first and second elements received within their respective pockets in a first position and movable outwardly from the pockets to a second position to couple the coupling members together in an operating mode of the assembly. The second position is characterized by abutting engagement of the first and second elements with respective shoulders of the members. The apparatus also includes a reciprocating armature arranged concentrically relative to the at least one excitation coil and is axially movable when the at least one excitation coil is supplied with current. The apparatus further includes an actuator bridge mounted for axial reciprocating movement with the armature and is connected to the elements at opposite ends of the bridge to move the elements in unison between the first and second positions during axial movement of the armature to control the operating mode of the assembly.

The first element may be a locking element.

The locking element may be an injection molded strut.

The second element may be an impact energy storage element to absorb and store impact energy to reduce undesirable noise and contact stress caused by a transition between operating modes of the coupling assembly.

The bridge may include a pair of plungers supported at opposite ends of the bridge wherein the elements may be pivotally connected to leading ends of their respective plungers.

The at least one coil, the housing and the armature may comprise a low profile solenoid.

The storage element may include a rigid insert having an elastomeric layer surrounding the insert.

The elastomeric layer may be a high-temperature resistant layer molded over the insert.

The storage element may carry elastomeric material defining opposite end sections of the storage element. Each end section may be configured to deflect upon abutting engagement with respective shoulders of the members.

The insert may be formed in a metal injection molding (MIM) process.

The subassembly may further include a pair of biasing members. Each of the biasing members may bias its respective plunger and connected element.

The subassembly may further include at least one return biasing member to urge the bridge to a return position which corresponds to the second positions of the elements.

The housing may have an axially extending skirt to attach the apparatus to the first coupling member.

Each element may include at least one projecting leg portion which provides an attachment location for the leading end of its respective plunger.

Each leg portion may have an aperture wherein the apparatus may further include a pivot pin received within each aperture to allow rotational movement of the elements in their respective pockets in response to axial movement of the bridge and wherein the leading ends of the plungers may be connected to their respective elements via the pivot pins.

Each aperture may be an oblong aperture to receive its respective pivot pin to allow both rotation and translational movement of the elements in response to reciprocating movement of the armature.

The above object and other objects, features, and advantages of the present invention are readily apparent from the following detailed description of the best mode for carrying out the invention when taken in connection with the accompanying drawings.

DETAILED DESCRIPTION

Figure 1:
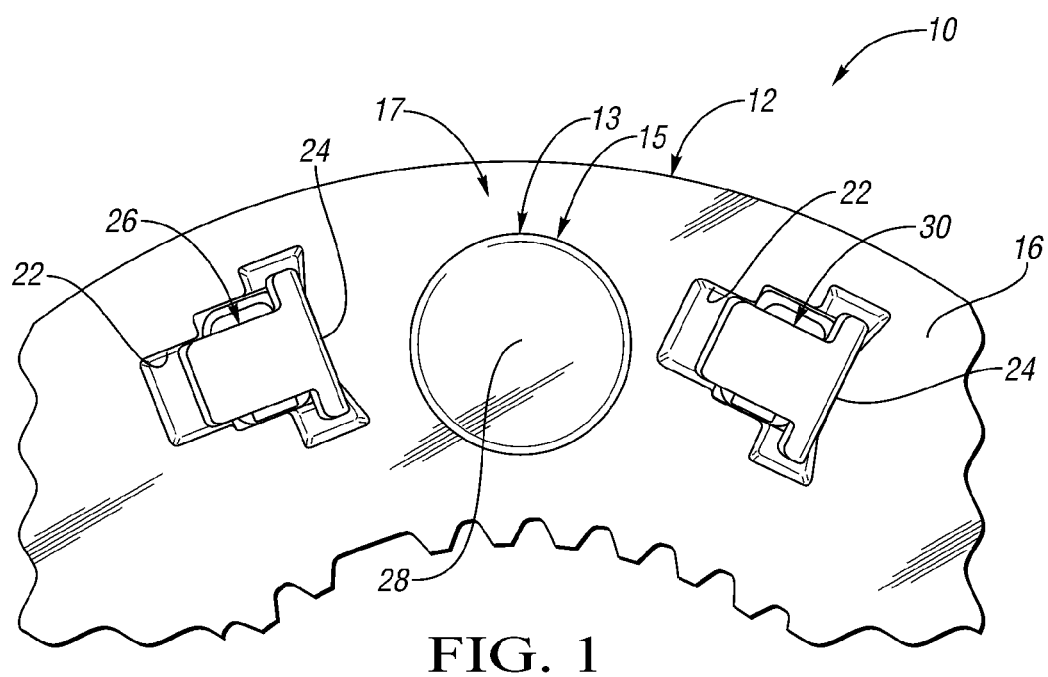
FIG. 1 is a top plan view, partially broken away, of a coupling member subassembly of a coupling assembly and supported electromechanical apparatus which controls the assembly.
Figure 2:
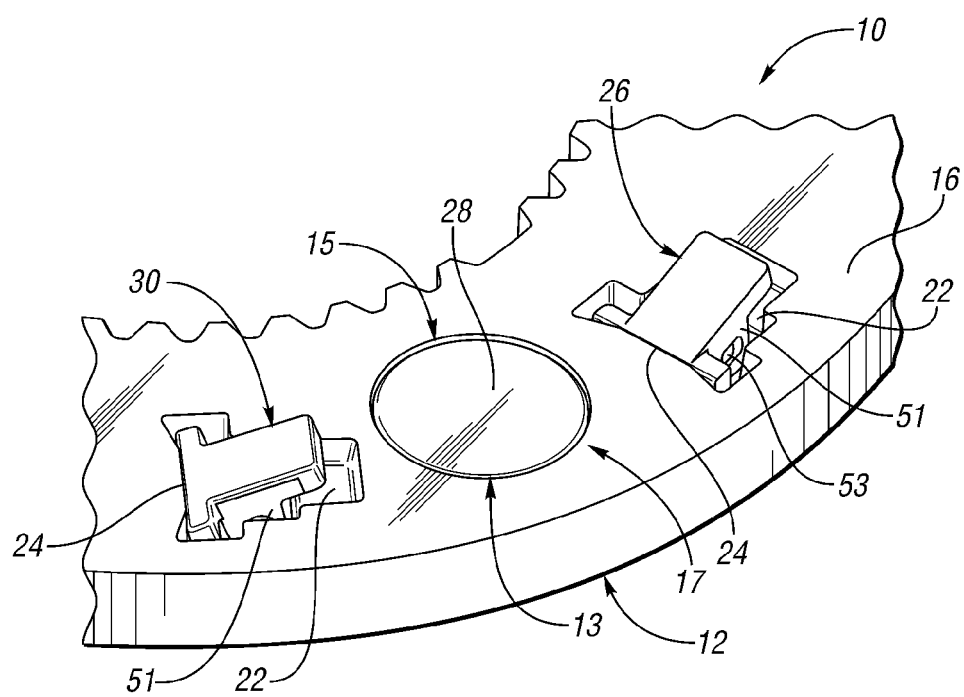
FIG. 2 is a top perspective view, partially broken away, of the coupling member subassembly of FIG. 1 with elements of the apparatus in their extended, coupling positions.
Figure 3:
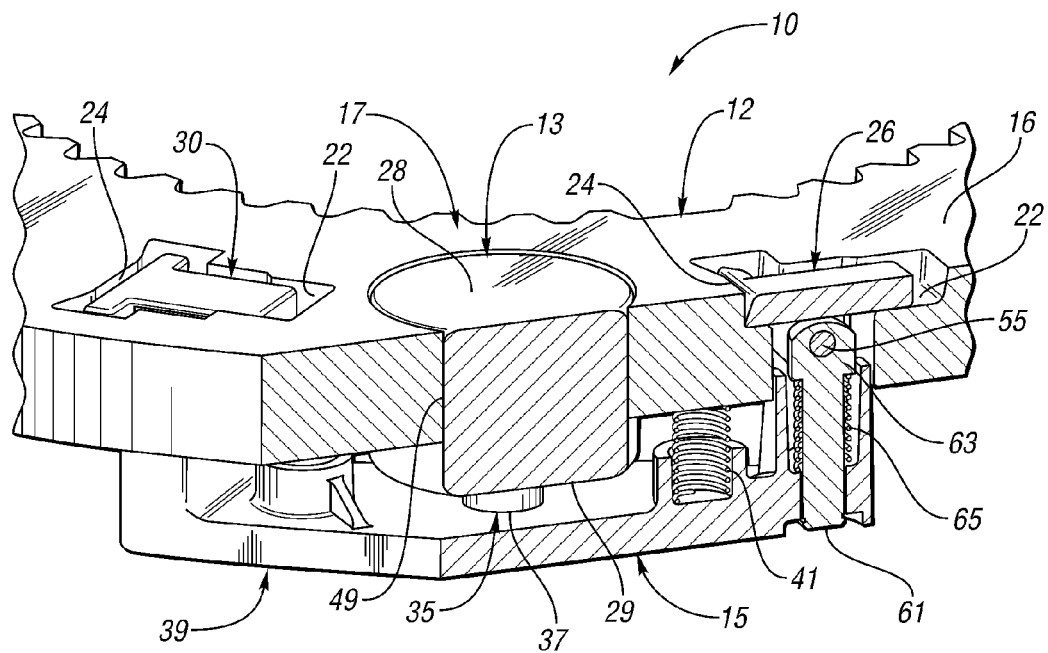
FIG. 3 is a top perspective view, partially broken away and in cross section, of the coupling member subassembly of FIGS. 1 and 2 with the elements of the apparatus in their retracted, uncoupling positions.
Figure 4:
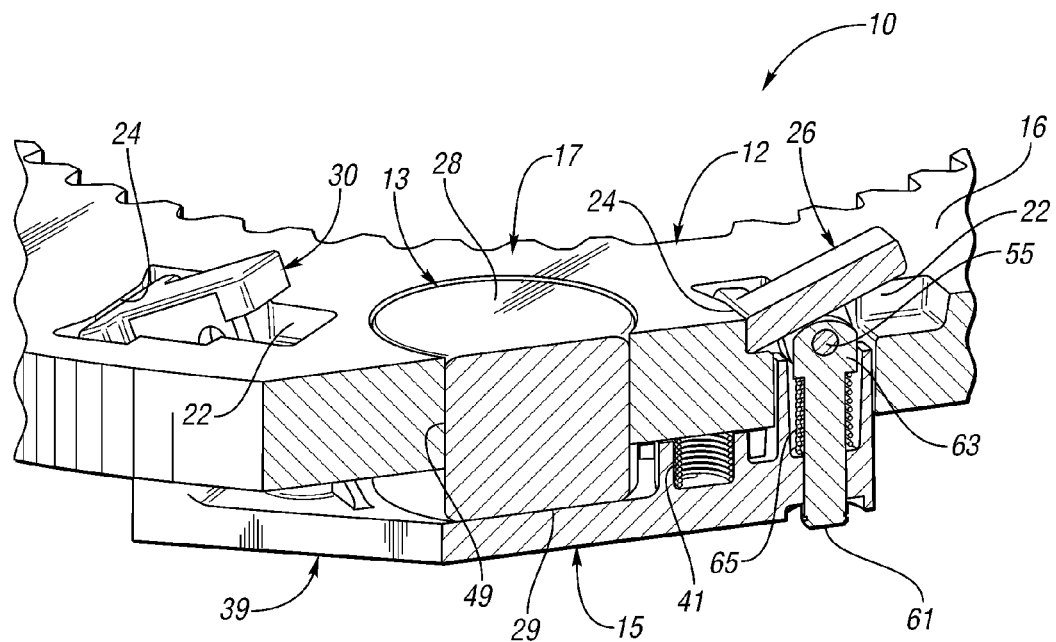
FIG. 4 is a view, similar to the view of FIG. 3, with the elements of the apparatus in their extended, coupling positions.
Figure 5:
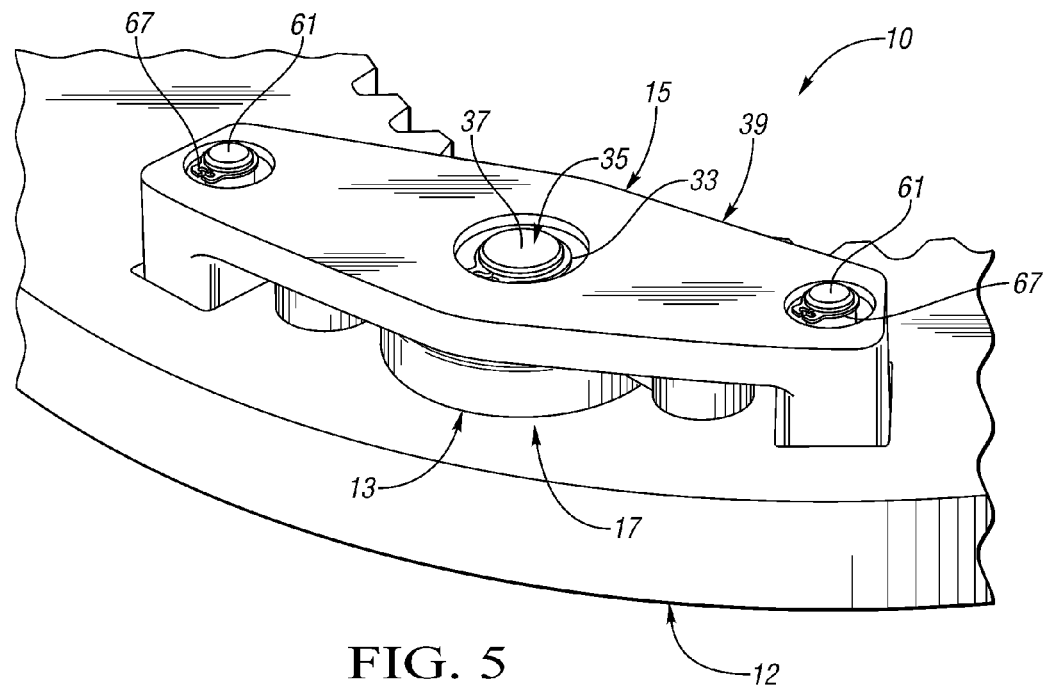
FIG. 5 is a bottom perspective view, partially broken away, of the coupling member subassembly and supported electromechanical apparatus.
Figure 6:
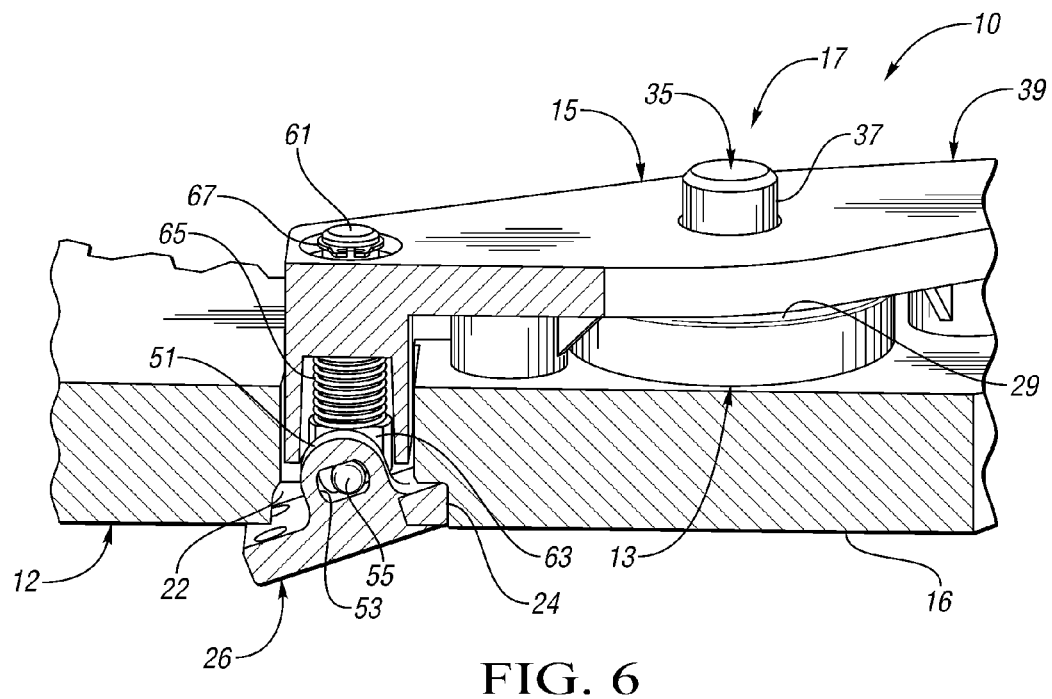
FIG. 6 is an enlarged bottom perspective view, partially broken away and in cross section, of the coupling member subassembly with the elements of the apparatus in their extended, coupling positions.
Figure 7:
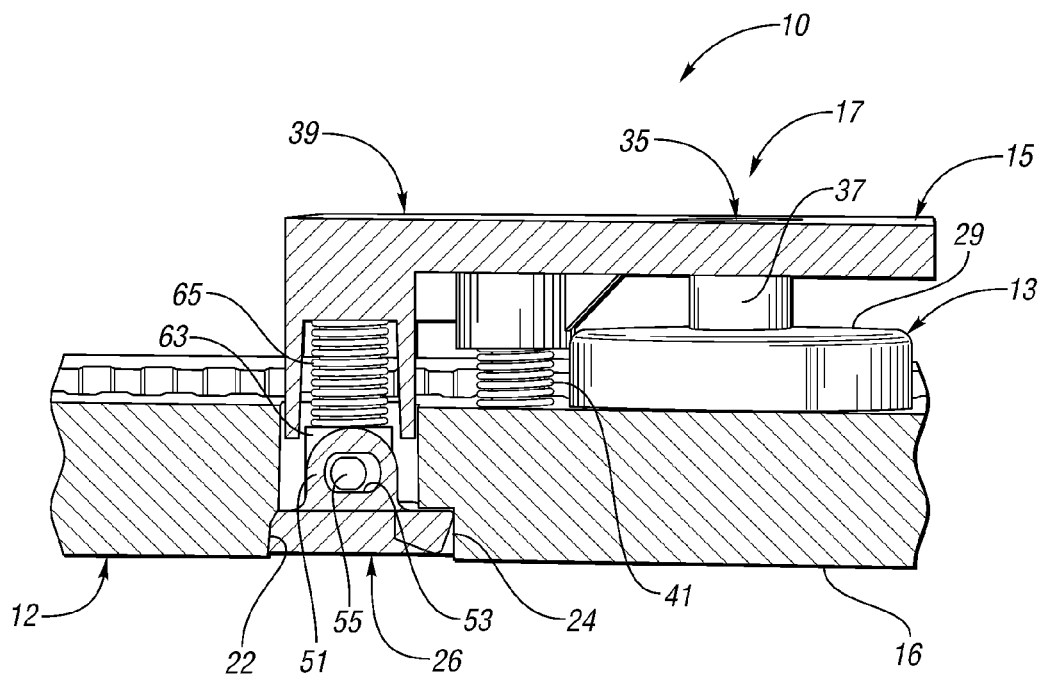
FIG. 7 is a side view, partially broken away and in cross section, of the coupling member subassembly and apparatus with the elements in their retracted, uncoupled positions.
Figure 8:
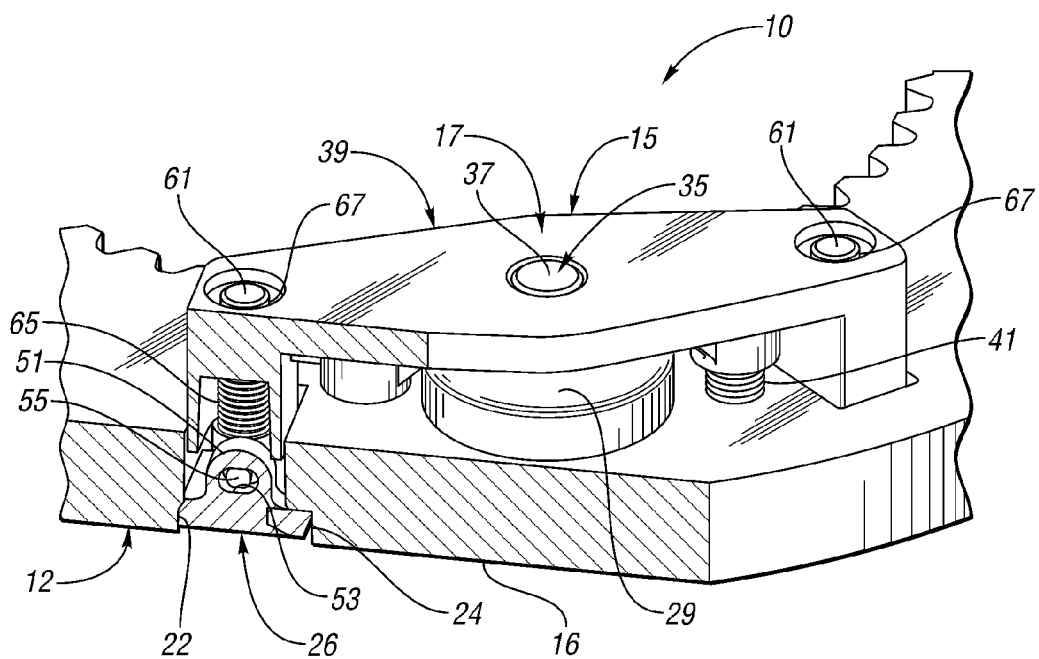
FIG. 8 is a bottom perspective view, partially broken away and in cross section, of the coupling member subassembly and apparatus with the elements in their retracted, uncoupled positions.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1-8, there is illustrated a coupling member subassembly, generally indicated at 10, for use in a planar, controllable coupling assembly. The coupling assembly may be a ratcheting, one-way clutch assembly. The subassembly 10 includes a first coupling member or pocket plate, generally indicated at 12. The assembly typically includes a notch plate or member (not shown). The subassembly 10 also includes an electromechanical apparatus, generally indicated at 15. The first coupling member 12 includes a coupling face 16 in closed-spaced opposition with a coupling face of the notch plate (not shown) of the assembly when the plates are assembled and held together by a locking or snap ring. At least one of the plates is mounted for rotation about a common rotational axis.

The outer coupling face 16 of the member or plate 12 has a pair of angularly spaced, T-shaped recesses or pockets 22. Each of the recesses 22 defines a load-bearing first shoulder 24. The corresponding coupling face of the notch plate has a plurality of recesses or notches. Each notch of the notches defines a load-bearing second shoulder.

The electromechanical apparatus 15 may include one or more locking struts or elements, one of which is generally indicated at 26, disposed between the coupling faces of the members when the members are assembled and held together. The element 26 may comprise a metal locking element or strut movable between first and second positions. The first position (FIGS. 2, 4 and 6) is characterized by abutting engagement of the locking element 26 with a load-bearing shoulder (not shown) of the notch plate and the shoulder 24 of the pocket 22 formed in the member 12. The second position (FIGS. 1, 3, 7 and 8) is characterized by non-abutting engagement of the locking element 26 with a load-bearing shoulder of at least one of the notch plate and the member 12.

Additionally, the apparatus 15 may include one or more impact energy storage elements or synthetic rubber struts, one of which is generally indicated at 30 in FIGS. 1-4, 9 and 10, to dampen the rotation between the members.

The electromechanical apparatus 15 includes a housing, generally indicated at 13, which has two closed axial ends including end walls 28 and 29. The housing 13 may be a metal part of a conventional solenoid, generally indicated at 17. As is well known in the art, the solenoid 17 includes an electromagnetic source having at least one excitation coil which is at least partially surrounded by the housing 13. The solenoid 17 of the apparatus 15 also includes a reciprocating armature, generally indicated at 35, arranged concentrically relative to the at least one excitation coil and is axially movable when the at least one excitation coil is supplied with current.

The armature 35 is connected by a locking ring 33 at its leading end 37 to an actuator bridge, generally indicated at 39, which is mounted for axial reciprocating movement with the armature 35 and is connected to the elements 26 and 30 at opposite ends of the bridge 39 to move the elements 26 and 30 between their coupling and uncoupling positions.

The bridge 39 includes a pair of plungers 61 supported at opposite ends of the bridge 39. The element or strut 26 is pivotally connected to a leading end 63 of one of the plungers 61 and the element 30 is pivotally connected to a leading end (not shown) of the other one of the plungers 61.

The element 26 controls the operating mode of the coupling assembly. The impact energy storage element 30 of FIGS. 9 and 10 absorbs and stores impact energy to reduce undesirable noise and contact stress caused by a transition between operating modes of the coupling assembly.

The element 26 and the element 30 are both pivotally connected to the leading end 63 of its respective plunger 61 wherein each plunger 61 pivotally moves its respective element 26 or 30 within its respective pocket 22 in response to reciprocating movement of the armature 35. Each of the plungers 61 is spring biased by a spring 65 which extends between its leading end 63 and a top surface at the ends of the bridge 39. Also, each plunger 61 is coupled to the bridge 39 at its opposite ends by a locking ring 67.

The apparatus 15 also preferably includes a pair of spaced return springs 41. Each spring 41 extends between the bottom surface of the plate 12 and the top surface of the bridge 39 to return the armature 35 to its home position when the coil of the apparatus 15 is de-energized, thereby returning the elements 26 and 30 to their uncoupling positions.

The housing 13 may have holes to allow oil to circulate within the housing 13. Preferably, the solenoid 17, including the housing 13, the coil and the armature 35, is a low profile solenoid. The housing 13 has an axially extending skirt 49 to attach the apparatus 15 to the coupling member 10 of the assembly via a friction tight fit. The locking element 26 may be a metal injection molded (i.e. MIM) strut.

Figure 9:
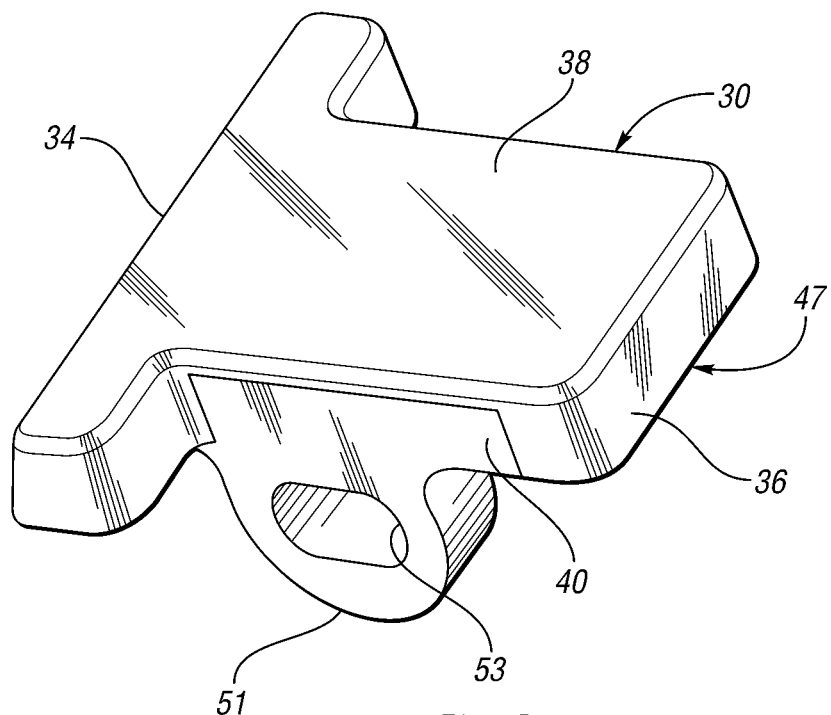
FIG. 9 is a top perspective view of a rubberized or rubber element of the pair of elements.
Figure 10:
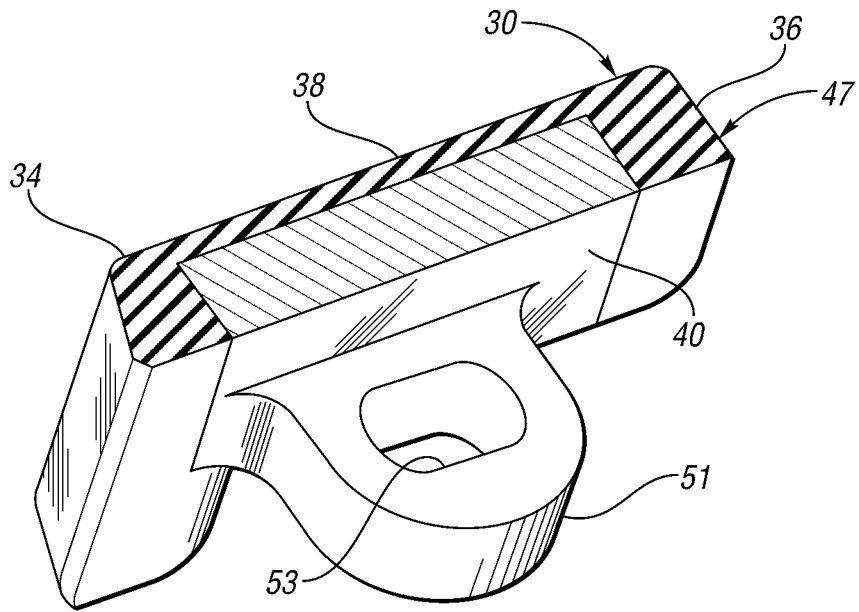
FIG. 10 is a bottom perspective view, in cross section, of the element of FIG. 9.

Referring to FIGS. 9 and 10, the storage element 30 may include a rigid insert 40 and a high temperature-resistant, elastomeric outer covering layer, generally included at 47, bonded to the insert 40. The outer covering layer 47 may be molded over the insert 40 in a thermoset injection molding process.

The storage element 30 carries the high temperature-resistant, elastomeric material which defines opposite end sections 34 and 36 of the storage element 30. The end section 34 deflects upon abutting engagement with the shoulder 24 of the plate 12 and the other end section 36 deflects upon engagement with a shoulder of the notch plate.

Each element, either 30 or 26, includes at least one, and preferably two, projecting leg portion 51 which provide an attachment location for the leading end 63 of its respective plunger 61. Each leg portion 51 has an aperture 53. The apparatus 15 further includes a pivot pin 55 received within each aperture 53 to allow rotational movement of the elements 30 and 26 in response to reciprocating movement of the armature 35 wherein the leading ends 63 of the plungers 61 are connected to the elements 30 and 26 via their respective pivot pins 55.

Preferably, the apertures 53 are oblong apertures which receive the pivot pins 55 to allow both rotation and translation movement of the elements 30 and 26 in response to reciprocating movement of the armature 35, the connected bridge 39 and the plungers 61.

Each locking strut 26 may comprise any suitable rigid material such as metal, (i.e. steel). In accordance with at least one embodiment of the invention, each storage strut 30 (i.e. FIGS. 9 and 10) may comprise any suitable base polymer that displays rubber-like elasticity, such as an unsaturated or saturated rubber material including, but not limited to, a nitrile rubber such as a hydrogenated nitrile butadiene rubber (HNBR). The storage struts 30 are configured to dampen rotation and, consequently, engagement noise of the clutch assembly. For example, a portion or portions of each storage strut 30 such as the end portion 34 and 36 and/or middle portions 38 of each storage strut 30 may comprise one or more elastomeric materials, and the remainder of each storage strut 30 may comprise a metal, such as the metal steel insert 40.

Generally, each of the storage elements 30 carries resilient material defining the opposite end sections 34 and 36 of the storage element 30. Each storage element 30 is movable between coupling and uncoupling positions between the members including the member 12 of the assembly. The coupling position is characterized by abutting engagement of the opposite end sections 34 and 36 with respective shoulders of the member 12 and the notch plate. The uncoupling position is characterized by non-abutting engagement of one of its end sections 34 and 36 with at least one of the member 12 and the notch plate. Each end section 34 or 36 is configured to deflect or compress upon abutting engagement with respective shoulders of the member 12 and the notch plate.

In other words, the storage element 30 of the elements may include the rigid insert 40 and the elastomeric outer covering layer 47 surrounding and bonded to the insert 40. The insert 40 may be a die-casting formed in a metal injection molding (MIM) process. The outer covering layer 47 is then molded over the insert 40. The molding may be a thermoset elastomer or a thermoplastic elastomer (TPE) which combines the rubber-like properties of a thermoset elastomer and the processing characteristics of a thermoplastic.

The above concept uses one or more metal or rigid struts 26 and one or more synthetic rubber struts 30. However, preferably, a single metal strut 26 and a single rubber strut 30 are utilized. The material properties of the rubber are stable in hot transmission fluid or oil. A typical range of operating temperatures for the fluid or oil is −30° to 155° C.

While exemplary embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the electromechanical apparatus 15 of the exemplary clutch assembly may be carried by a driving member of the clutch assembly or a driven member of the assembly. Moreover, the struts of the exemplary clutches assembly may have any suitable configuration depending on whether the assembly is a planar coupling assembly as shown herein or a radial coupling assembly (not shown). Also, each strut or rocker (in a radial coupling assembly) may have a middle portion that is thicker than each end portion of the strut or rocker.

The above noted designs may eliminate the need to keep backlash low which leads to lower stress (higher durability), which leads to lower cost race materials like aluminum or FC208 PM.

Also, while a preferred base polymer is identified above as HNBR, other acceptable materials include but are not limited to fluroelastomers, carboxylated nitrile butadiene rubber, nitrile butadiene rubber and ethylene acrylic rubber.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. An electromechanical apparatus including a pair of simultaneously actuated elements for use in a controllable coupling assembly, the apparatus comprising:
   a housing;
   an electromagnetic source including at least one excitation coil surrounded by the housing;
   a pair of spaced first and second elements;
   a reciprocating armature arranged concentrically relative to the at least one excitation coil and being axially movable when the at least one excitation coil is supplied with current;
   an actuator bridge mounted for axial reciprocating movement with the armature and connected to the elements at opposite ends of the bridge to move the elements in unison between first and second positions during axial movement of the armature to control the operating mode of the coupling assembly; and
   wherein the second element is an impact energy storage element to absorb and store impact energy to reduce undesirable noise and contact stress caused by a transition between operating modes of the coupling assembly.

2. The apparatus as claimed in claim 1, wherein the first element is a locking element.

3. The apparatus as claimed in claim 2, wherein the locking element is an injection molded strut.

4. The apparatus as claimed in claim 1, wherein the at least one coil, the housing and the armature comprise a low profile solenoid.

5. The apparatus as claimed in claim 1, wherein the storage element includes a rigid insert having an elastomeric layer surrounding the insert.

6. The apparatus as claimed in claim 5, wherein the elastomeric layer is a high temperature-resistant layer molded over the insert.

7. The apparatus as claimed in claim 5, wherein the insert is a die casting formed in a metal injection molding (MIM) process.

8. The apparatus as claimed in claim 1, wherein the storage element carries elastomeric material defining opposite end sections of the storage element, the end sections being configured to deflect upon abutting engagement with load-bearing shoulders of coupling members of the coupling assembly.

9. The apparatus as claimed in claim 1, further comprising at least one return biasing member to urge the bridge to a return position which corresponds to second positions of the elements.

10. The apparatus as claimed in claim 1, wherein the housing has an axially extending skirt to attach the apparatus to a first or second member of the coupling assembly.

11. An electromechanical apparatus including a pair of simultaneously actuated elements for use in a controllable coupling assembly, the apparatus comprising:
    a housing;
    an electromagnetic source including at least one excitation coil surrounded by the housing;
    a pair of spaced first and second elements;
    a reciprocating armature arranged concentrically relative to the at least one excitation coil and being axially movable when the at least one excitation coil is supplied with current;
    an actuator bridge mounted for axial reciprocating movement with the armature and connected to the elements at opposite ends of the bridge to move the elements in unison between first and second positions during axial movement of the armature to control the operating mode of the coupling assembly; and
    wherein the bridge includes a pair of plungers supported at opposite ends of the bridge and wherein the elements are pivotally connected to leading ends of their respective plungers.

12. The apparatus as claimed in claim 11, further comprising a pair of biasing members, each of the biasing members biasing its respective plunger and connected element.

13. The apparatus as claimed in claim 11, wherein each element includes at least one projecting leg portion which provides an attachment location for the leading end of its respective plunger.

14. The apparatus as claimed in claim 13, wherein each leg portion has an aperture and wherein the apparatus further comprises a pivot pin received within each aperture to allow rotational movement of the elements in response to axial movement of the bridge and wherein the leading ends of the plungers are connected to their respective elements via the pivot pins.

15. The apparatus as claimed in claim 14, wherein each aperture is an oblong aperture to receive its respective pivot pin to allow both rotational and translational movement of the elements in response to reciprocating movement of the armature.

16. A coupling member subassembly for use in a controllable coupling assembly having multiple operating modes, the subassembly comprising:
    a first coupling member of the assembly supported for rotation relative to a second coupling member of the assembly about a common rotational axis, the first coupling member having a first coupling face with a pair of angularly-spaced pockets, each of the pockets defining a load-bearing first shoulder; and
    an electromechanical apparatus attached to the first coupling member and including:
        a housing;

an electromagnetic source including at least one excitation coil at least partially surrounded by the housing;

a pair of spaced first and second elements received within their respective pockets in a first position and movable outwardly from the pockets to a second position to couple the coupling members together in an operating mode of the assembly, the second position being characterized by abutting engagement of the first and second elements with respective shoulders of the members;

a reciprocating armature arranged concentrically relative to the at least one excitation coil and being axially movable when the at least one excitation coil is supplied with current; and an actuator bridge mounted for axial reciprocating movement with the armature and being connected to the elements at opposite ends of the bridge to move the elements in unison between the first and second positions during axial movement of the armature to control the operating mode of the assembly.

17. The subassembly as claimed in claim 16, wherein the first element is a locking element.

18. The subassembly as claimed in claim 17, wherein the locking element is an injection molded strut.

19. The subassembly as claimed in claim 16, wherein the second element is an impact energy storage element to absorb and store impact energy to reduce undesirable noise and contact stress caused by a transition between operating modes of the coupling assembly.

20. The subassembly as claimed in claim 19, wherein the storage element includes a rigid insert having an elastomeric layer surrounding the insert.

21. The subassembly as claimed in claim 20, wherein the elastomeric layer is a high temperature-resistant layer molded over the insert.

22. The subassembly as claimed in claim 20, wherein the insert is formed in a metal injection molding (MIM) process.

23. The subassembly as claimed in claim 19, wherein the storage element carries elastomeric material defining opposite end sections of the storage element, each end section being configured to deflect upon abutting engagement with respective shoulders of the members.

24. The subassembly as claimed in claim 16, wherein the bridge includes a pair of plungers supported at opposite ends of the bridge and wherein the elements are pivotally connected to leading ends of their respective plungers.

25. The subassembly as claimed in claim 24, further comprising a pair of biasing members, each of the biasing members biasing its respective plunger and connected element.

26. The subassembly as claimed in claim 24, wherein each element includes at least one projecting leg portion which provides an attachment location for the leading end of its respective plunger.

27. The subassembly as claimed in claim 26, wherein each leg portion has an aperture and wherein the apparatus further includes a pivot pin received within each aperture to allow rotational movement of the elements in their respective pockets in response to axial movement of the bridge and wherein the leading ends of the plungers are connected to their respective elements via the pivot pins.

28. The subassembly as claimed in claim 27, wherein each aperture is an oblong aperture to receive its respective pivot pin to allow both rotation and translational movement of the elements in response to reciprocating movement of the armature.

29. The subassembly as claimed in claim 16, wherein the at least one coil, the housing and the armature comprise a low profile solenoid.

30. The subassembly as claimed in claim 16, further comprising at least one return biasing member to urge the bridge to a return position which corresponds to the second positions of the elements.

31. The subassembly as claimed in claim 16, wherein the housing has an axially extending skirt to attach the apparatus to the first coupling member.

* * * * *